No. 823,999. PATENTED JUNE 19, 1906.
C. O. ECKLEY.
GUN SIGHT.
APPLICATION FILED MAY 24, 1905.
2 SHEETS—SHEET 1.
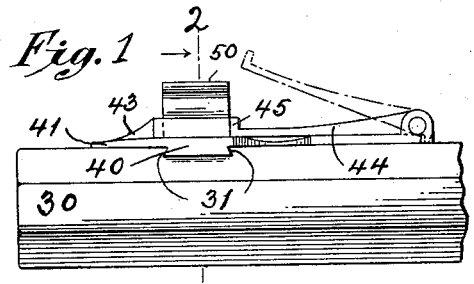
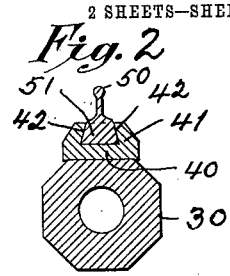
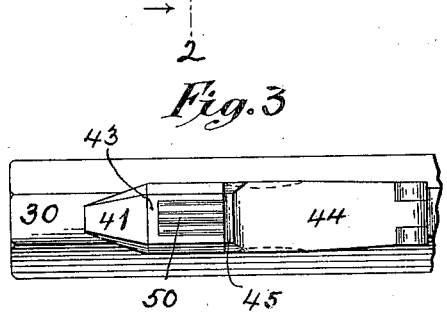
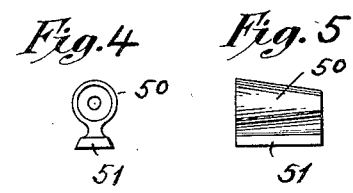
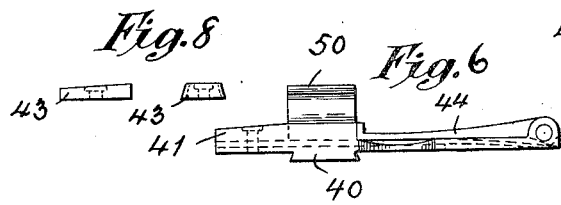
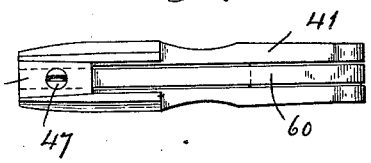
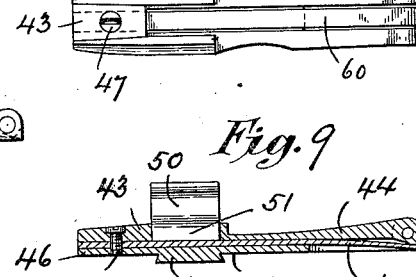
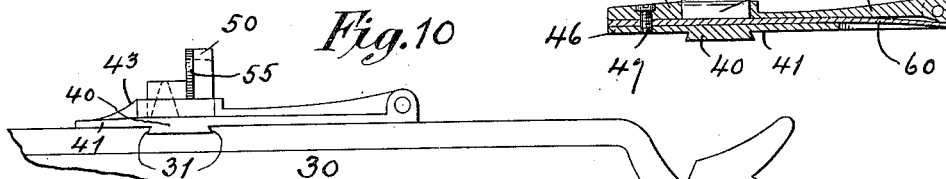
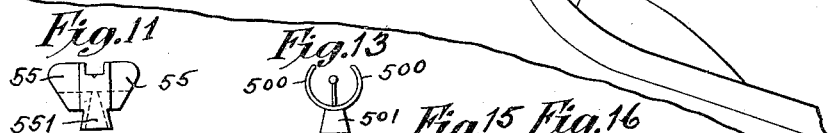
Attest:
Alan C. McDonnell
May Hughes
Inventor:
Carroll O. Eckley
by William R. Baird
his Atty.

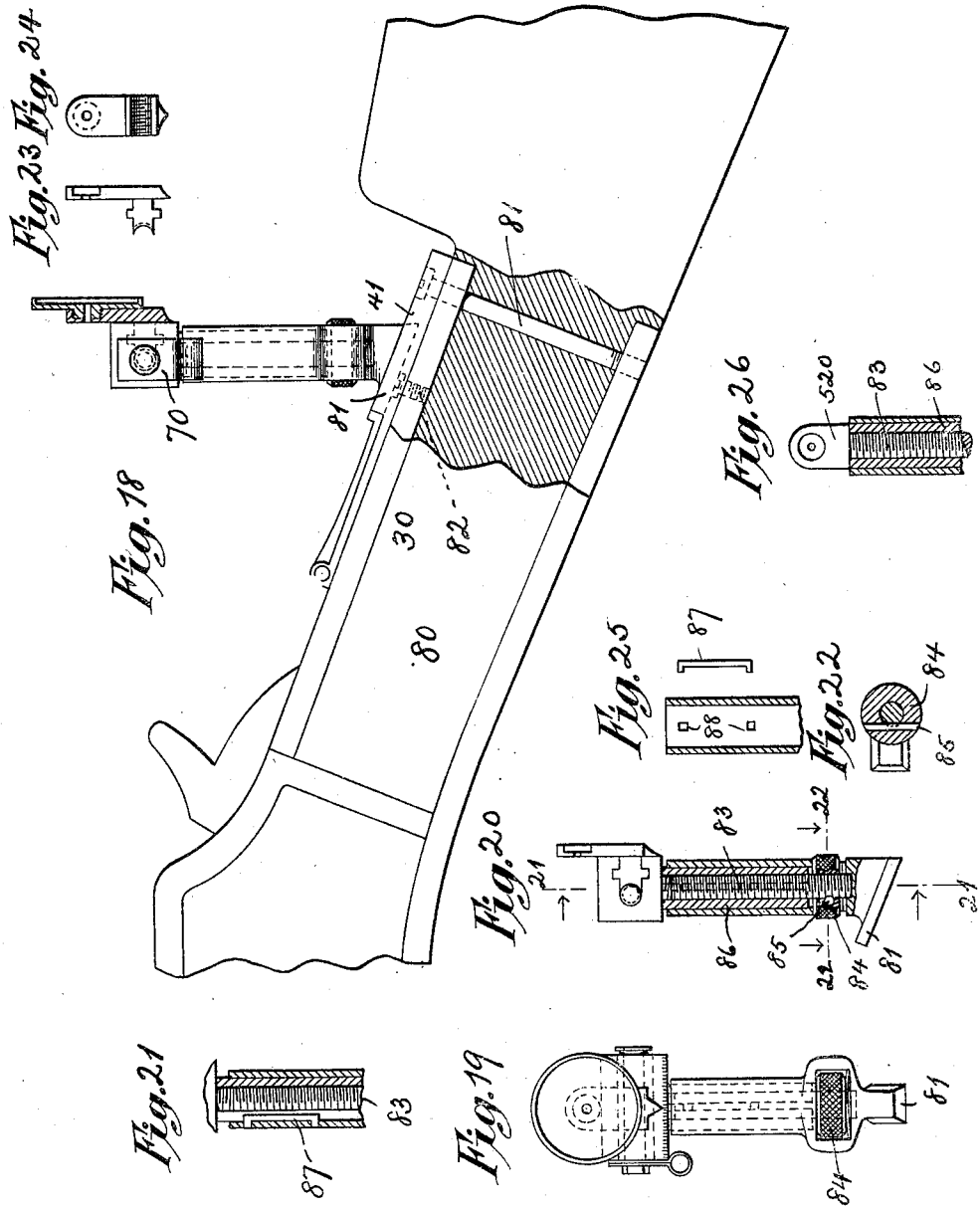

UNITED STATES PATENT OFFICE.

CARROLL O. ECKLEY, OF NEW YORK, N. Y.

GUN-SIGHT.

No. 823,999.      Specification of Letters Patent.      Patented June 19, 1906.

Application filed May 24, 1905. Serial No. 262,047.

*To all whom it may concern:*

Be it known that I, CARROLL O. ECKLEY, a citizen of the United States, residing at New York, in the county of New York and State of New York, have invented certain new and useful Improvements in Gun-Sights, of which the following is a specification.

My invention relates to gun-sights; and its novelty consists in the construction and adaptation of the parts, as will be more fully hereinafter pointed out.

It is essential in using the sight of a firearm that its position with respect to the longitudinal axis of the arm shall be rigid—that is, it may vary slightly in position along such longitudinal axis; but if it varies in a plane at right angles thereto its usefulness is destroyed.

It has long been desirable to provide firearms with sights which might be readily removed and replaced by sights of different construction and for different purposes; but, so far as known to me, this want has not heretofore been adequately supplied, and it is the purpose of my invention to supply it. To that end I provide a firearm with a longitudinal shoe or groove adapted to receive a sight which is itself provided with a base fitting snugly within the groove and is held in place by a pivoted plate or lever, so that the sight can readily be removed by lifting the lever and a new sight put in position to take its place.

In the drawings, Figure 1 is a side elevation of a firearm provided with my improved device near the muzzle, the sight lock or lever being shown in a dotted outline in a raised position. Fig. 2 is a transverse section on the plane of the lines 2 2 in Fig. 1. Fig. 3 is a top plan view of the parts shown in Fig. 1. Fig. 4 is a front elevation, and Fig. 5 is a side elevation, of a modified form of the sight shown in Figs. 1, 2, and 3. Fig. 6 is a side elevation of a modified form of the gun-sight, comprising a retaining-spring for the lock-lever. Fig. 7 is a top plan view of the parts shown in Fig. 6 with the sight and sight-lock removed. Fig. 8 comprises front and side elevations of the sight-stopping piece of the kind shown in Fig. 6, and Fig. 9 is a vertical medial longitudinal section of the parts shown in Fig. 6. Fig. 10 is a side elevation of a portion of a firearm near the breech and which is provided with my improved device. Fig. 11 is a rear elevation of the form of sight shown in Fig. 10. Fig. 12 is a bottom plan view of the same sight removed from the arm. Fig. 13 is a rear elevation of another form of sight adapted to be used as shown in Fig. 10, and Fig. 14 is a side view of the same. Fig. 15 is a rear elevation, Fig. 16 a side elevation, and Fig. 17 is a bottom plan view, of yet another form of sight adapted to be used in the position shown in Fig. 10. Fig. 18 is a side elevation and partial section of a portion of a firearm provided with a modified form of sight comprising a wind-gage. Fig. 19 is a rear elevation of the form of sight shown in Fig. 18, but removed from the firearm. Fig. 20 is a vertical central section and partial elevation of the parts shown in Fig. 19 looking from the left in that figure. Fig. 21 is a vertical section on the plane of the lines 21 21 in Fig. 20. Fig. 22 is a horizontal section on the plane of the lines 22 22 in Fig. 20. Fig. 23 is a detail of parts of the wind-gage and sight shown in Fig. 20, but removed from its adjacent parts; and Fig. 24 is a front elevation of the same. Fig. 25 comprises details of some of the parts shown in Fig. 21; and Fig. 26 is a modified form of the sight-post, differing slightly from that shown in Fig. 20.

I shall first refer to the construction illustrated in Figs. 1 to 5. In these figures, 30 represents a portion of the barrel of a firearm near the muzzle. It is provided on its upper surface with a transverse dovetailed groove 31, adapted to receive the foot 40 of a shoe 41, which rests snugly against the upper surface of the barrel. This shoe has a dovetail longitudinal groove 42 extending part way along its length and is provided at its front with an abutting flange 43. At its rear end, hinged on a pivot provided for the purpose, is secured a lock-lever 44, which in turn at its front end is provided with an abutting flange 45. The sight 50 is of any approved form, but is provided with an expanding base 51, adapted to fit snugly within the groove 42 and to be embraced thereby. The shoe 41 is also provided with inwardly-extending finger-recesses, so that the lock-lever 44 may be the more readily grasped to lift it on its hinge.

The mode of operation of the device is readily understood. The shoe 41 is first fitted in place on the gun-barrel, (although it will readily be seen that it may be made integral with the gun-barrel if it is more convenient to do so.) The lever 44 being lifted up, the sight 50 is then slipped in place and the lock-lever 44 depressed, when the sight will be firmly held between the flange 43 of the shoe and the flange 45 of the lock-lever. If it is desired to replace, for instance, the sight shown in Figs. 1 and 2 by that shown in Figs. 4 and 5, the former sight is slipped out and the latter inserted in its place.

In Figs. 6, 7, 8, and 9 the abutment 43 is made separable from the base-plate 46 of the shoe 41 and secured in place by a screw 47. A longitudinal spring 60 is placed between the base-plate and the abutment and caused to extend rearwardly underneath the hinge of the lock-lever 44, so as to exert a constant tension against the latter to hold it in place. This form of construction will be found desirable in many cases.

In Figs. 10 to 17 there is illustrated a form of construction of the device not differing in principle from that heretofore described, but varying the mode of its application. In these figures the shoe 41 is shown secured at the rear end of the gun-barrel and near to its breech. The shoe is the same as before; but the sights are different. In Figs. 10, 11, and 12, for instance, the sight is shown as provided with wings 55 55 and the bases 551. This sight, it will be noticed, is reversible, it being possible to insert either the base 551, as shown in Fig. 11, or the base 552, as shown in Fig. 12, in the groove in the shoe and then secure the benefit of two forms of sight in one structure. In Figs. 13 and 14 are shown a sight having a sleeve 500 and base-plate 501. In Figs. 15, 16, and 17 are shown a further form of reversible sight 510, the two bases 511 and 515 affording the opportunity of using it in two positions, 512 being the sighting-point in one position and 513 in the other. The sight shown in these three figures is adapted for the muzzle of the gun only.

In Figs. 18 to 22 there is illustrated a sight combined with a wing-gage 70. In this construction the shoe 41 is secured to the stock 80 of the firearm by means of the screw 81, with which it is already usually provided, and an additional screw 82, if the latter is necessary, this screw being shown in dotted outline in Fig. 18. The sight is provided with a base 81, which fits into the groove in the shoe. It is also provided with a threaded vertical post 83, secured to a thumb-nut 84 by a pin 85. This post engages with the threaded sleeve 86, which carries on its upper extremity the wind-gage and sight proper, the sleeve being prevented from rotation by means of the feather 87, which engages with the apertures 88 88. The construction shown in Fig. 26 is an ordinary pin-hole sight 520, mounted upon the post 83 in place of the wind-gage.

What I claim as new is—

1. The combination with a barrel or other appropriate part of a firearm provided with a longitudinal groove, of a gun-sight adapted to fit into and be retained in said groove and means for holding the sight in place comprising a hinged lock secured to the barrel and adapted to abut against the sight when in position.

2. The combination with a barrel or other appropriate part of a firearm provided with a longitudinal dovetail groove, of a gun-sight provided with a base adapted to fit into and be retained in said groove and means for holding the sight in place comprising a hinged lock secured to the barrel and adapted to abut against the sight when in position.

3. The combination with a firearm, of a removable shoe, a removable sight adapted to be secured on said shoe and locking means carried by the shoe and acting against the end of the sight for holding the sight in place thereon.

4. The combination with a firearm, of a removable shoe, a removable sight adapted to be secured on said shoe and means for holding the sight in place thereon comprising a dovetail groove in the shoe and a corresponding dovetail base for the sight and a movable locking-piece carried by the shoe.

5. The combination with a firearm, of a removable shoe, a removable sight adapted to be secured on said shoe and means for holding the sight in place thereon comprising a dovetail groove in the shoe and a corresponding dovetail base for the sight in combination with a lock-lever adapted to abut against the sight to prevent its longitudinal movement.

6. The combination with a firearm having a barrel provided with a transverse dovetailed groove on its upper surface, of a shoe adapted to fit in said groove and a sight adapted to be removably secured to said shoe by means of a longitudinal groove in the shoe and a base on the sight adapted to fit into said groove and a pivoted locking device carried by and removable with the shoe.

7. The combination with a firearm, of a removable shoe provided with an abutment and a longitudinal groove, a gun-sight provided with a base adapted to fit in said groove and rest against said abutment and means comprising a movable opposing abutment for locking the sight against movement away from said shoe-abutment.

8. The combination with a firearm, of a removable shoe provided with an abutment and a longitudinal groove, a gun-sight provided with a base adapted to fit in said groove and rest against said abutment and means for locking the sight against movement away from said abutment comprising a hinged lever adapted to be swung snugly against the opposite end of the sight.

9. The combination with a firearm provided with an upper longitudinal groove along its barrel, of a reversible gun-sight provided with two bases at an angle to each other, each base provided with a flange adapted to fit into and engage with said groove.

10. The combination with a firearm provided with an upper longitudinal groove along its barrel, of a reversible gun-sight provided with two bases at an angle to each other, each base provided with a flange adapted to fit into and engage with said groove, and means for locking the sight in place after adjustment.

11. The combination with a firearm provided with an upper longitudinal groove along its barrel, of a reversible gun-sight provided with two bases at an angle to each other, each base provided with a flange adapted to fit into and engage with said groove and means for locking the sight in place after adjustment comprising a hinged lock-lever adapted to be swung snugly against the base of the sight.

12. The combination with a firearm provided with an upper longitudinal groove along its barrel, of a reversible gun-sight provided with two bases at an angle to each other, each base provided with a flange adapted to fit into and engage with said groove and means for locking the sight in place after adjustment on one side and an abutment preventing its displacement on the other side.

In testimony whereof I hereunto affix my signature in presence of two witnesses.

CARROLL O. ECKLEY.

Witnesses:
　EARNEST R. ECKLEY,
　EMILY T. HENNING.